Feb. 17, 1931.  C. SAURER  1,792,872

MOTOR MOUNTING

Filed June 15, 1928

INVENTOR
Curt Saurer
BY
*Ernest H. Johnson*
ATTORNEY

Patented Feb. 17, 1931

1,792,872

UNITED STATES PATENT OFFICE

CURT SAURER, OF CLEVELAND, OHIO, ASSIGNOR TO THE MECHANICAL RUBBER COMPANY, OF CLEVELAND, OHIO, A CORPORATION OF NEW JERSEY

MOTOR MOUNTING

Application filed June 15, 1928. Serial No. 285,533.

This invention relates to improvements in motor mountings, especially mountings for motors carried by vehicles such as automobiles.

In the development of motor mountings the object has been to obtain quietness and to provide a mounting which will absorb high frequency vibrations in one plane, namely the vertical plane in the case of an automobile with substantial rigidity in another plane, the horizontal plane.

In order to obtain the above mentioned desired results, the applicant has invented a motor mounting which employs a sheet of resilient material such as rubber compound between a supporting bracket and an arm of the motor. This type of material insures a quiet mounting.

In order to absorb the high frequency vibrations a portion of the sheet of cushioning material is compressed, in the plane of the high frequency vibrations, by the bracket and motor arm.

The shock vibrations are absorbed or dampened by providing a portion of the sheet of resilient material between the bracket and motor arm in such a manner that there is little or no compression on the cushioning material in the horizontal plane.

Without limiting the invention more than is required by the prior art, applicant's specific invention consists of providing one or the other of the motor arm or supporting bracket with a V-shaped ring with which engages a pin carried by the other of said bracket or motor arm, the ring and pin having complementary V-shaped surfaces between which the sheet of cushioning material is positioned.

The preferred embodiments of the invention are shown in the accompanying drawings in which.

Figure 1:
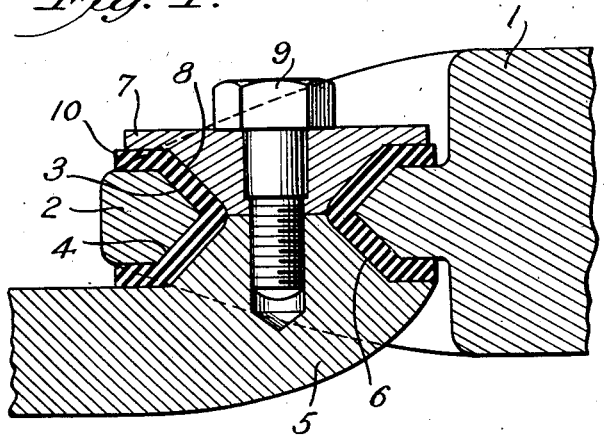
Fig. 1 is a vertical section through one form of the engine mounting.

In the modification shown in Fig. 1 reference numeral 1 indicates the engine arm which may be either integral with the engine block or may be attached thereto in any suitable manner. The arm 1 has integral therewith the ring 2 which has conical faces 3 and 4 as shown in Fig. 1. Suitably mounted on the frame of the car is the supporting arm 5 which has a conical face 6 complementary to the conical face 4 of the arm 1. A washer 7 having a conical face 8 complementary to the conical face 3 is connected with the arm 5 by means of the screw 9. A sheet of vulcanized rubber compound 10 or other resilient material such as rubberized fabric or a rubber compound having a fibrous ingredient, is positioned between the complementary faces of the arm 1 and the arm 5. In the assembled mounting the horizontal portion of the rubber is placed under compression due to the weight of the engine and the screw 9 is turned down tightly enough to prevent looseness between the arm 1 and the arm 6 but without compressing the rubber to any considerable degree.

Figure 2:
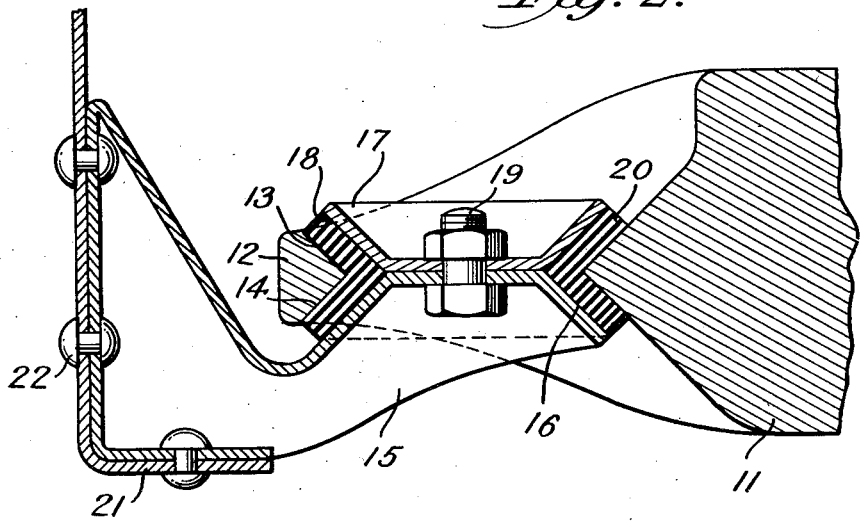
Fig. 2 is a vertical sectional view through a modification of the engine mounting.

A modification shown in Fig. 2 has an arm 11 either integral with the engine block or attached thereto in any suitable manner. The engine arm 11 carries integrally the ring 12 having conical faces 13 and 14. The supporting arm 15 has a cup-shaped portion with a conical face 16 complemental to the conical face 14. A cup shaped washer 17 having a conical face 18 complemental to face 13 is bolted, as shown at 19, to the supporting arm 15. The sheet of rubber compound 20 or other suitable resilient material as above mentioned is positioned between the complemental faces of the engine arm and the supporting arm. The supporting arm 15 is fastened to the side rail 21 of the car frame by the rivets 22.

As will appear from the description and the accompanying drawings the applicant has provided a bracket simple in construction but providing a support of great strength for the engine which does not allow for free movement in any direction. The sheet of resilient material or rubber compound provides a noiseless connection between the automobile frame and the engine and also serves to absorb high frequency vibrations and to dampen shocks and twisting stresses. The high frequency vibrations are set up by the rapidly moving parts of the engine and are therefore in a vertical plane. Such vibrations are transmitted to the rubber through the metal of the engine and are absorbed therein since high frequency vibrations are not transmitted to any great degree from the rubber to the metal because the coefficient of elasticity of the rubber is small compared with that of the metal. Shocks and twisting vibrations occur chiefly in a horizontal plane since they are due to the motion of the car over uneven roads and to rapid acceleration and deceleration of the car. The construction of the mountings is such that the rubber provides a substantial rigidity in the horizontal plane, at the same time allowing for a small amount of give or play, which exists between the supporting arm of the bracket and the engine arm, so that shocks and twisting motions in the horizontal plane are dampened, and the damaging effects therefrom correspondingly lessened due to the novel construction of the mounting.

While preferred forms of the invention have been described in detail, it is not intended thereby to limit the invention thereto, but as will occur to those skilled in the art other modifications within the scope of the invention are conceivable and for an understanding of the scope of the invention reference should be made to the claim.

Having thus described my invention, what I claim and desire to protect by Letters Patent is:

A motor support which comprises a bracket having a conical supporting face, a cap member adapted to be secured to the bracket and provided with a conical face diverging from the face of the bracket, an arm carried by the motor, said arm having an aperture the walls of which are shaped to conform to the faces of the bracket and cap member, and a sheet of vulcanized rubber composition between the bracket and arm.

Signed at Cleveland, county of Cuyahoga, State of Ohio, this 7th day of June, 1928.

CURT SAURER.